United States Patent

Rowley et al.

[11] 4,014,435
[45] Mar. 29, 1977

[54] COLLAPSIBLE RACK FOR SHIPPING AND/OR STORING GLASS SHEETS

[75] Inventors: James R. Rowley, Freeport; Paul D. Majesky, Upper St. Clair, both of Pa.

[73] Assignee: PPG Industries, Inc., Pittsburgh, Pa.

[22] Filed: May 12, 1975

[21] Appl. No.: 576,916

Related U.S. Application Data

[63] Continuation-in-part of Ser. No. 493,440, July 31, 1974, abandoned.

[52] U.S. Cl. .................. 206/386; 206/451; 206/454; 214/10.5 R
[51] Int. Cl.² .......................................... B65D 85/48
[58] Field of Search .......... 105/466, 469, 471–472; 206/448–452, 454, 386; 211/41, 49 R; 214/10.5 R; 248/119 R

[56] References Cited

UNITED STATES PATENTS

| | | | |
|---|---|---|---|
| 2,566,179 | 8/1951 | Evans, Jr. et al. | 206/454 X |
| 3,199,464 | 8/1965 | Shook | 105/463 |
| 3,645,389 | 2/1972 | Castiaux | 206/454 |
| 3,709,358 | 1/1973 | Andrews et al. | 206/451 |
| 3,809,234 | 5/1974 | Kurick | 206/451 X |
| 3,878,942 | 4/1975 | Hansen et al. | 206/454 |

FOREIGN PATENTS OR APPLICATIONS

| | | | |
|---|---|---|---|
| 1,486,365 | 12/1970 | Germany | 206/454 |
| 68,857 | 9/1969 | Germany | 206/454 |

*Primary Examiner*—Steven E. Lipman
*Attorney, Agent, or Firm*—Donald Carl Lepiane

[57] ABSTRACT

A collapsible rack includes a base for supporting articles, e.g., glass sheets, on an edge and is detachably secured to a pair of L-shaped supports to maintain the supports in spaced relationship. A pair of struts is detachably secured to vertical portions of the L-shaped supports to support the articles in a vertical position. Banding is provided to unitize the articles and the L-shaped supports together to provide a stabilized rack.

20 Claims, 9 Drawing Figures

COLLAPSIBLE RACK FOR SHIPPING AND/OR STORING GLASS SHEETS

RELATED APPLICATION

This is a continuation-in-part of U.S. patent application Ser. No. 493,440 filed on July 31, 1974, in the names of James R. Rowley and Paul D. Majesky and entitled "A Collapsible Rack For Shipping And/Or Storing Glass Sheets" now abandoned.

BACKGROUND OF THE INVENTION

1. Field of the Invention

This invention relates to shipping racks, and more particularly, to a rack for shipping and/or storing glass sheets and the like, which can be readily assembled and disassembled, i.e., collapsed.

2. Discussion of the Prior Art and Technical Problems.

Shipping bins or racks that are readily assembled and disassembled are desirable. This is because more empty racks can be stored in a given area if the racks can be disassembled, thereby more efficiently utilizing storage area. Further, more empty racks can be returned in a truck or railcar if the racks can be disassembled, thereby reducing transportation costs.

However, in order to realize any economical advantage from savings in storage space and transportation costs, (1) the racks should be readily assembled and disassembled, (2) the loaded racks should provide adequate protection to the glass sheets during handling and/or shipping of the loaded rack, and (3) the loaded rack should be easily accessible for lifting as for example by a forklift truck.

The racks should be readily assembled and disassembled because of high labor costs which can offset any savings realized in reduced storage space or reduced transportation costs. The racks when loaded with glass sheets should adequately protect the glass sheets because damaged glass sheets can reduce savings realized in reduced storage space or reduced transportation costs. The loaded racks should be easily accessible for lifting because increased handling to position the rack for lifting, e.g., by a forklift truck can reduce savings realized in reduced storage space and reduced transportation costs.

Disclosed in U.S. Pat. No. 3,709,358 is a package of glass sheets. The package includes a stack of glass sheets arranged vertically on a pair of spaced L-shaped brackets. The stack of glass sheets is strapped to the L-shaped brackets.

Although the package of glass sheets as disclosed in the above-mentioned patent is readily assembled and disassembled, it has limitations. More particularly, (1) the package of glass sheets does not provide adequate protection to the glass during handling and/or shipping of the package; and (2) the package can only be lifted as by a forklift truck from the front or back side.

The package of glass disclosed in the above-mentioned patent does not provide adequate protection to the glass sheets during handling and shipping because the L-shaped supports are not maintained in an upright position and in spaced relation during loading, unloading and shipment thereof. In the instance when the sheets are individually loaded or unloaded, the L-shaped members can rack, i.e., pivot toward or away from each other. When this occurs, the glass sheets can fall from the L-shaped members and become damaged. Further, there are no provisions for protecting the edges of the glass sheets during shipment and handling. For example, there are no facilities to prevent a forklift truck from engaging and chipping the edges of the loaded glass sheets. The package of glass disclosed in the above-identified patent is normally lifted as by a forklift truck from the front or back sides by engaging the bottom of the stack of glass sheets. This has several drawbacks. Namely, padding has to be provided on the forks of the forklift truck to prevent damage to the bottom edge of the glass sheets; and the package has to be positioned so that the forklift truck has access to either the front or back side of the package of glass.

Another drawback of the package of glass as disclosed in the above-mentioned patent is that straps, e.g., 5 straps, are used to prevent longitudinal and lateral motion of the glass sheets during shipment. This practice is expensive because of material costs and labor costs to apply the straps to the stack of glass sheets. Further, disposing of the straps creates a solid waste problem.

Still further, the jointure of the pair of arms to provide the L-shaped support does not have additional supporting structure to prevent the arms from separating due to transportational forces. The transportation forces increase as the height of the loaded glass pack increases. Therefore the rack of the above-identified patent may be suitable for shipping small glass plates but not for shipping large glass plates.

In U.S. Pat. No. 3,645,389, there is taught a device for packaging a stack or stacks of glass sheets. The device includes a rectangular frame formed of two wooden L-shaped sections and is positioned around a stack of glass sheets. A panel or floor member is disposed between one side of the frame and a face of the stack so that the edges of the glass sheets rest upon the floor member. On both ends of the floor member there are mounted stops which abut faces of the stack to prevent movement of the stack with respect to the frame.

The drawbacks of the above-identified packing device is lack of versatility in shipping different quantities and sizes of glass sheets. More particularly, the L-shaped sections encompass the glass sheets thereby requiring that the L-shaped section be tailor made to prevent movement of the glass sheets during shipment. Although fillers can be used to secure the sheets within the L-shaped supports, disposing of the fillers creates a solid waste disposal problem.

Further, the packing device lacks structural stability because the device can rack during shipment or handling or stacking. This is because the transportation forces tend to shift the packing device from a rectangular shaped packing device to a parallelogram shaped packing device. When this occurs, forces are put on the vertical members that can cause them to fail or the pack of glass sheets to become unstable. The instability of the glass sheets becomes more critical when the racks are stacked because the stacked racks can topple.

SUMMARY OF THE INVENTION

This invention relates to a collapsible rack for shipping and/or storing a plurality of flat sheets, e.g., glass sheets. The rack includes at least two L-shaped members made of a rigid material each having a vertical arm and a horizontal arm. Facilities are provided for maintaining the horizontal arm in spaced relation to a supporting surface, e.g., a floor, a truck bed, or a railcar bed. Detachably securing facilities are mounted on each of the L-shaped supports for maintaining the L-shaped supports in spaced relation.

This invention also relates to a method of loading sheets on a collapsible rack. A pair of L-shaped supports having facilities attached to the side portions for defining a course for flexible banding has a base mounted on the horizontal arms of the supports. The base has ribs to confine movement of the supports. A strut is secured to and between the vertical arm of the supports to provide a collapsible rack. A plurality of glass sheets are loaded on the rack in a generally vertical position and flexible banding is passed around the glass sheets and the defining facilities. The banding is then secured to urge the sheets toward the vertical members and downward against the base.

DESCRIPTION OF THE INVENTION

In the following discussion, like numerals refer to like elements.

Figures 1, 2:
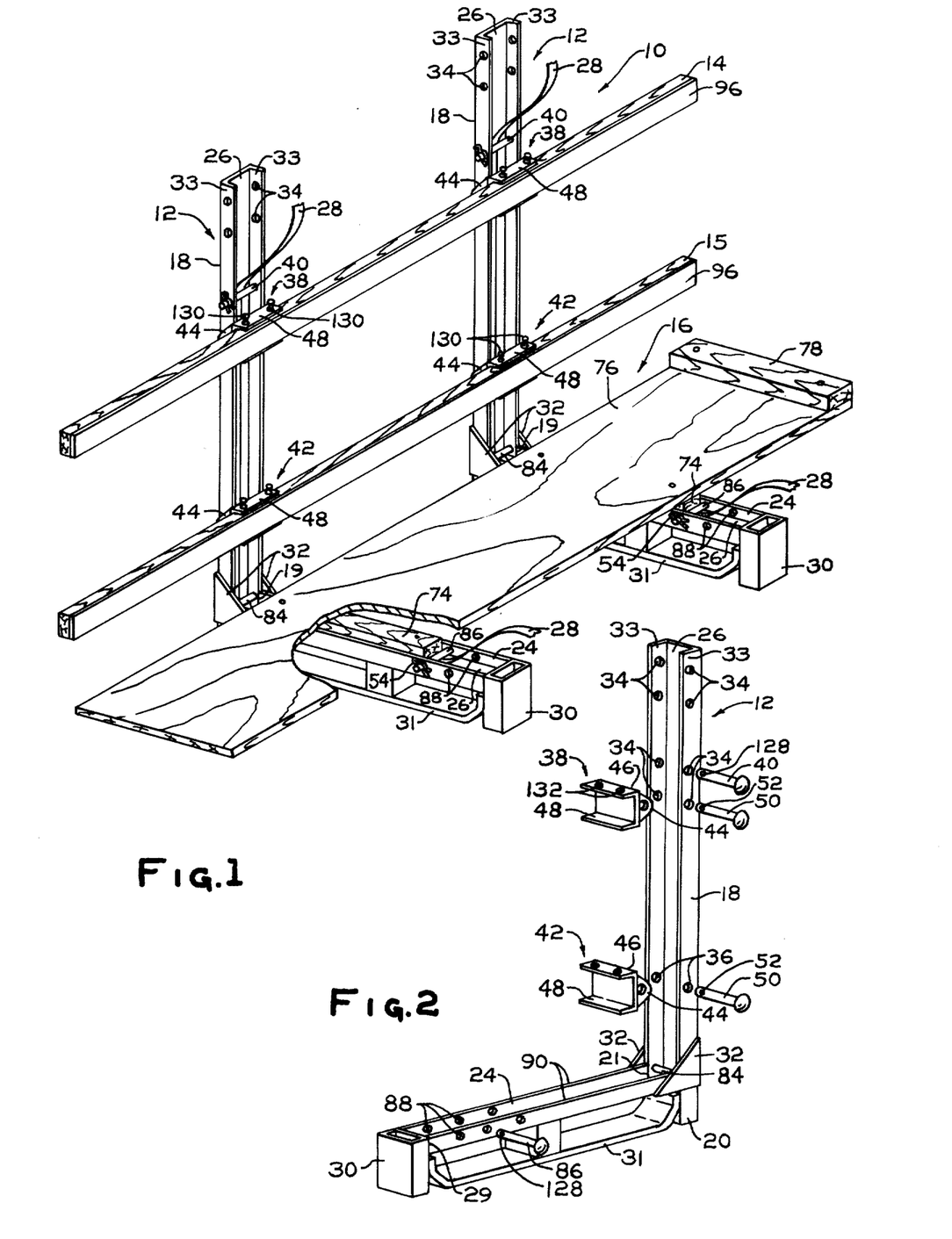
FIG. 1 is an isometric view of a collapsible rack constructed in accordance to the teachings of the invention and having portions removed for purposes of clarity.
FIG. 2 is an isometric view of an L-shaped support constructed in accordance to the teachings of the invention.
Figure 4:
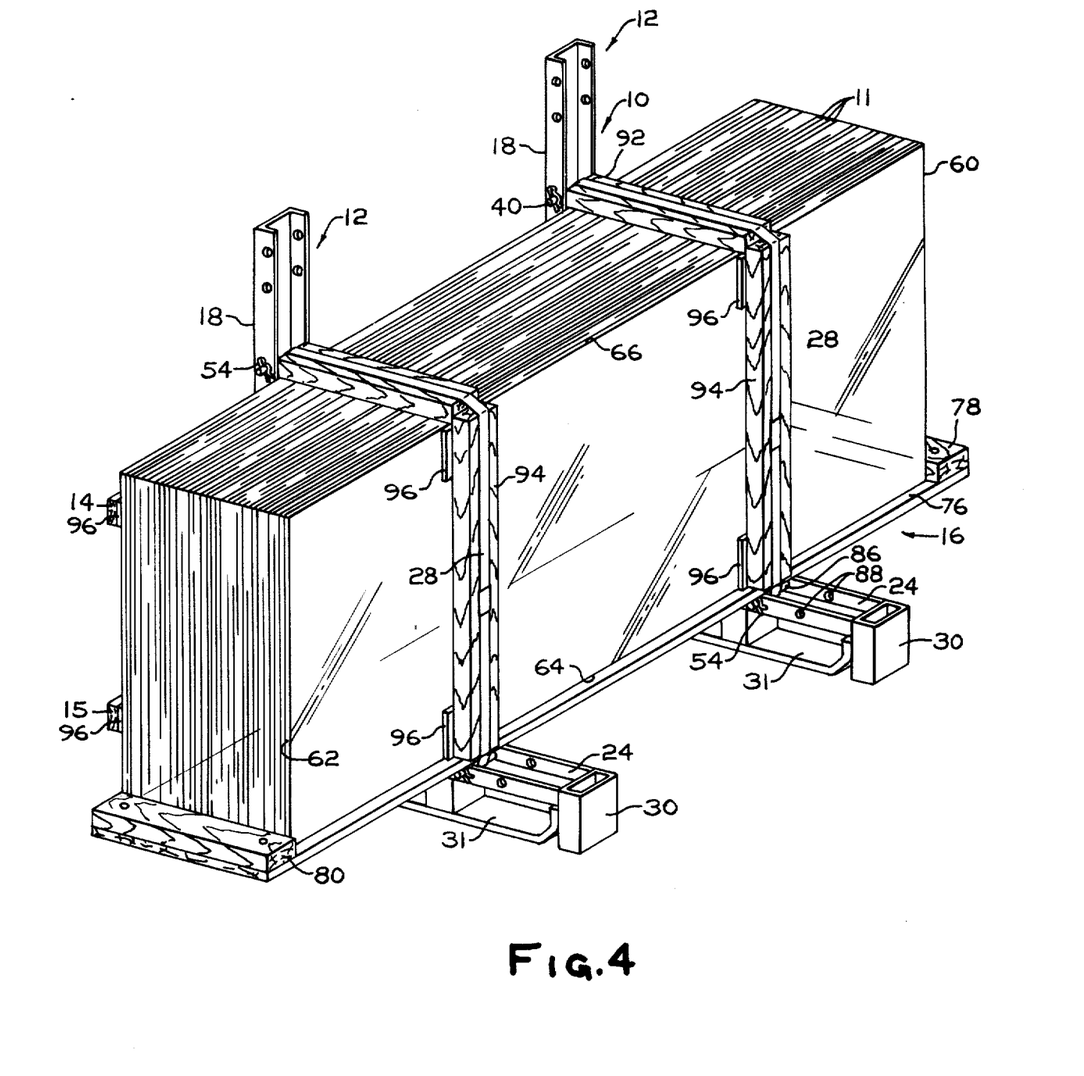
FIG. 4 is an isometric view of the rack of FIG. 1 loaded with a plurality of glass sheets.

With reference to FIG. 1, there is shown a rack 10 that is readily assembled and disassembled, i.e., a collapsible rack for shipping articles 11 (shown in FIG. 4). In the discussion, the articles 11 are flat glass sheets; however, the invention is not limited thereto. For example, the collapsible rack of the invention can be used to ship or store metal sheets, plywood, or any other type of sheet material. The rack 10 includes at least two rigid L-shaped supports 12 interconnected by a pair of struts 14 and 15 held in spaced relationship by a base 16.

The L-shaped supports 12 are identical in construction. Therefore, the discussion will be directed to one L-shaped support with the understanding that the discussion is applicable to other L-shaped supports unless indicated otherwise.

With reference to FIGS. 1 and 2, the L-shaped support 12 includes a first channel member 18, e.g., a vertical channel member or arm, joined at 19, to an end 21 of a second channel member 24, e.g., a horizontal channel member or arm, to provide the L-shaped support. The channel members 18 and 24 are joined together to provide a guideway 26 for receiving banding 28 (shown in FIG. 1) to be discussed below. End 29 of the horizontal channel member 24 is provided with a spacer member 30 and the channel members 18 and 24 are joined at 19 spaced from end 20 of the channel member 18 to maintain the L-shaped supports in spaced relation to the floor level to provide access for lifting the rack 10, e.g., by a forklift truck. Positioned between the spacer members 30 and adjacent end 20 of the channel member 18 and attached thereto in any conventional manner is a stabilizer bar 31 of the type used in the art. The stabilizer bar 31 provides additional stability when the rack is loaded on a truck and when the rack is handled with a forklift truck.

In the prior art, particularly U.S. Pat. Nos. 3,645,389 and 3,709,358, the package of glass can only be lifted from the front or back. The collapsible rack of this invention can be lifted from any side. Further, providing a base 16 in accordance to the teachings of the invention, the bottom edge of the glass sheets are protected against damage during lifting of the rack 10.

As can be appreciated, the channel members 18 and 24 are made of a rigid material such as aluminum, steel or fiber glass. Further, the L-shaped support 12 may be formed as a single part instead of joining two channel members. Also, the channel members 18 and 24 may be detachably secured at 19 as by pins (not shown) passing through the channel members 18 and 24, respectively. If desired, the channel members 18 and 24 may also be hinged together with a lockable hinge to collapse the L-shaped support. Still further, the invention is not limited to using channel members in that any type of rigid structural member may be used in place thereof.

In the preferred embodiment, the channel members 18 and 24, respectively, are secured together at 19 as by welding to provide a rigid, L-shaped support. A gusset plate 32 is secured to opposed sides of the channel members 18 and 24, at 19, for additional strength (see FIG. 1). The gusset plate 32 prevents the channel members 18 and 24 from separating at the weld point 19 thereby preventing the glass pack from lateral racking, i.e., moving from front to back as viewed in FIG. 1. In the prior art, e.g., in U.S. Pat. Nos. 3,645,389 and 3,709,358 there is no structural provisions for preventing lateral racking. When a packing device laterally racks it becomes unstable causing the loaded rack to collapse.

Opposed walls 33 of the vertical channel member 18 are advantageously provided with a plurality of top holes 34 and a bottom hole 36. The top holes 34 are employed to detachably secure a top cross support member 38 to the vertical support member 18 and to receive a headed pin 40 for defining the course of the banding 28 to be discussed below. The bottom hole 36 is employed to detachably secure a bottom cross support member 42 to the vertical support member 18. The cross support members 38 and 42 detachably secure the struts 14 and 15, respectively, between the vertical channel members 18 of L-shaped supports 12 in any conventional manner.

Each of the cross support members 38 and 42 have a pair of spaced plates 44 mounted to back side 46 of a U-shaped member 48. The plates 44 are detachably secured to the vertical channel member 18 by way of headed pin 50 which passes through holes 51 (one shown) in the plates 44 of the cross members and holes 34 and 36 of the vertical channel member. The pins 50 are detachably secured in place in any conventional manner as for example by providing the pin 50 with a hole 52 to receive a hitch pin 54 (see also FIG. 3).

With reference to FIG. 4, the invention is not limited to the number of L-shaped supports 12 that may be used nor is the invention limited to the spacing between the L-shaped supports. However, it has been found that the preferred distance between the L-shaped supports is equal to about one-half of the length of the articles 11 as measured between sides 60 and 62, i.e., at quarter points, to minimize or obviate bending moments from acting on the sheets 11 during shipment. More particularly, during shipment, the transportation forces tend to (1) bend the ends 60 and 62 of the sheets 11 about the adjacent vertical channel member 18; and (2) flex the glass sheets 11 between vertical channel members 18. By appropriate spacing of the L-shaped supports 12 and the struts 14 and 15, the bending moments are obviated. In the instance where the length of the glass sheets are greater than about 76 inches, it is recommended that more than two L-shaped support members be used in order to minimize the bending moments from acting on the articles during shipment.

Referring back to FIG. 1, the struts 14 and 15, for example, sections of lumber, or fiberglass, are detachably secured to each of the cross supports 38 and 42, respectively, in any conventional manner to provide ease of disassembling the rack 10. In addition to minimizing or obviating bending moments as previously discussed, the struts also maintain the vertical members 18 of the L-shaped supports 12 in a spaced relationship, thereby preventing longitudinal racking during loading or unloading of the rack. Longitudinal racking occurs when the L-shaped supports pivot toward or away from each other.

The distance of the bottom strut 15 from the base 16 is not critical to the practice of the invention. This is because the bottom strut 15 is primarily employed to maintain the surface of the innermost glass sheet from contacting the vertical support member which could mar the surface of the glass sheet. The problem of bending moments adjacent bottom edge 64 of the sheeets 11 (see FIG. 4) is not as critical as the bending moments adjacent the top edge 66. This is because the bottom edge 64 rests on the base 16.

Normally, the bottom strut 15 is spaced about 5 to 15 inches (12.7 to 38.1 centimeters) from the base depending on the width of the glass sheets 11 as measured between edges 64 and 66 (see FIG. 4). More particularly, as the width increases, the distance between the bottom strut 15 and the base 16 can be increased and vice versa.

The distance of the bottom strut 15 from the top strut 14 and the number of struts employed is a function of the width and thickness of the glass to prevent glass flexing. As the glass thickness decreases and the width increases, a greater number of struts are recommended to reduce the spacing between the struts.

The top strut 14 is normally positioned about 3 inches (7.6 centimeters) from the top edge 66 of the glass sheets 11 (see FIG. 4) to minimize bending moments acting on the top edge during transportation of the glass sheets.

Figure 3:
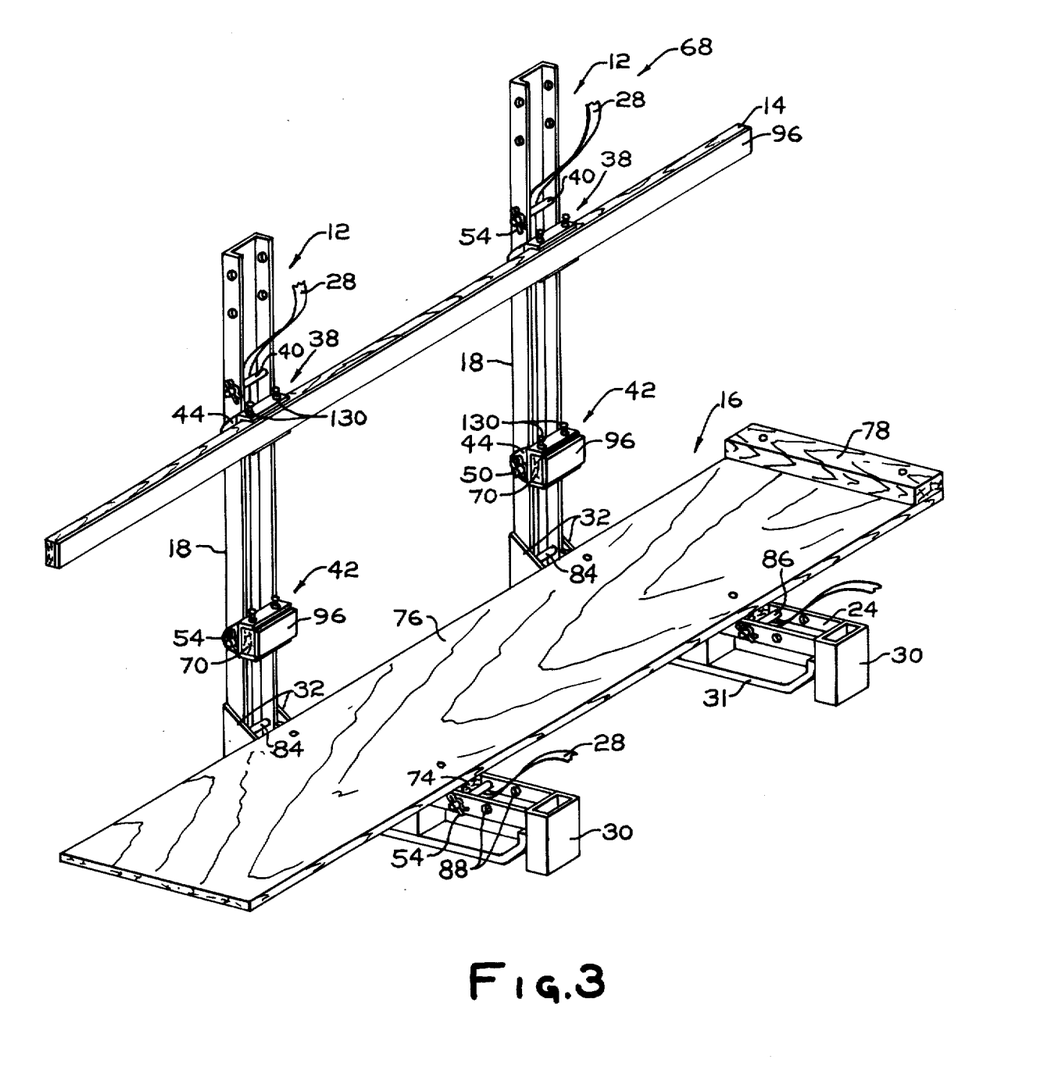
FIG. 3 is an isometric view of an alternate embodiment of a collapsible rack constructed in accordance to the teachings of the invention.

As can now be appreciated, the invention is not limited to providing a strut in each of the top and bottom cross support members 38 and 42, respectively. Referring to FIG. 3, there is shown a collapsible rack 68 similar to the collapsible rack 10 of FIG. 1 with the differences now to be discussed. Instead of a bottom strut 15 as shown in FIG. 1, there is provided in each of the bottom cross support members 42 a back support member 70, which provides a back support for the stack of glass sheets. Further, if desired, and in those instances where the articles are rigid, and there is no flexing of the articles, as for example, when the articles are metal sheets, the top strut 14 may be replaced with back supports in a similar manner as the bottom strut 15 was replaced with the back support members 70. When there are no struts employed, the L-shaped members are prevented from longitudinal racking and maintained in spaced relation by the base 16 in a manner to be discussed below.

Referring back to FIG. 1, the base 16, in addition to supporting the glass sheets on the bottom edge 64, maintains the L-shaped supports 12 in spaced relationship. This may be accomplished in any conventional manner as by providing surface 72 of the base 16 with a pair of spaced ribs 74 which sit in the portion of the guideway 26 of the horizontal channel member 24 on the banding 28.

Secured at one end of the top surface 76 of the base 16 is an end restraint 78 which can be used for seating the glass sheets when the rack is loaded. Referring to FIG. 4, an end restraint 80 may be secured at the opposite end of the base 16. In this instance, the end restraints 78 and 80 minimize or obviate longitudinal motion of the glass sheets during shipment. In the prior art, e.g., in U.S. Pat. No. 3,709,358 longitudinal motion of the glass sheets is obviated by providing straps around the glass sheets. This has limitations because (1) the straps can stretch during shipment; (2) disposing of the banding creates a solid waste problem; and (3) applying and removing the straps is time-consuming. By using end restraints 78 and 80 in accordance with the teachings of the invention, the above limitations are obviated.

The discussion will now be directed to the banding 28 which unitizes the glass sheets 11 and the rack 10. The banding 28 urges the glass sheets together as shown in FIG. 4 against the vertical channel member 18 of the L-shaped supports 12 and against the base 16 and horizontal channel member 24 to unitize the glass sheets. The banding also maintains the L-shaped supports and the glass sheets together to stabilize the rack. More particularly, the L-shaped supports and base 16 prevent lateral racking of the pack and the glass sheets prevent longitudinal racking of the pack. Lateral racking occurs when the glass sheets, oriented in a predetermined position, e.g., the vertical position resting on an edge 64, shift to a position other than the vertical position e.g., pivots about the edge 64. Longitudinal racking occurs when the L-shaped supports 12 pivot about the horizontal channel member 24. The banding or straps may be any of the type known in the art, for example, cloth webbing or steel bands.

Referring to FIG. 1, the course of the banding in the guideway 26 of the L-shaped supports is defined by the headed pin 40 positioned in one of the top holes 34 above the top cross support member 38 as viewed in FIG. 1; pin 84 mounted in the vertical channel member 18 at 19; and headed pin 86 positioned in one of a plurality of holes 88 provided in walls 90 of the horizontal channel member 24 (shown in FIG. 2). The headed pins 40 and 86 are preferably detachably secured to the L-shaped cross member to provide for various adjustments depending on the number of glass sheets and their width. The headed pins 40 and 86 may be detachably secured in a similar manner as headed pins 50 of the cross support members 38 and 42 are detachably secured. The pin 84 is preferably captured in the vertical channel member 18 by the gusset plates 32.

In the prior art. e.g., U.S. Pat. No. 3,645,389, the packing device has a rectangular frame made of two L-shaped sections for engaging the glass sheets to unitize them as a pack. The limitations of such a packing device is that the frame has to be tailor made to maintain the sheets as a unitized pack. Therefore, different size frames have to be stored for different size sheets. In the alternative fillers may be used within the frame to unitize the glass sheets. This is not desirable because (1) it creates a solid waste disposal problem when the rack is unloaded and (2) freight charges are paid for shipping fillers.

With reference to FIG. 4, the ends of the banding 28 extend over the top edge 66 of the glass sheets and the surface of the outermost sheet. Lash boards 92 and 94 are provided on the top edge 66 of the glass sheets and surface of the outermost sheet, respectively, to prevent damage to the articles and also to aid in compressing the articles.

In the instance where the articles are glass sheets, it is recommended that any surface of the rack contacting a major surface of the glass be provided with a resilient material 96 such as cardboard or rubber.

Figure 5:
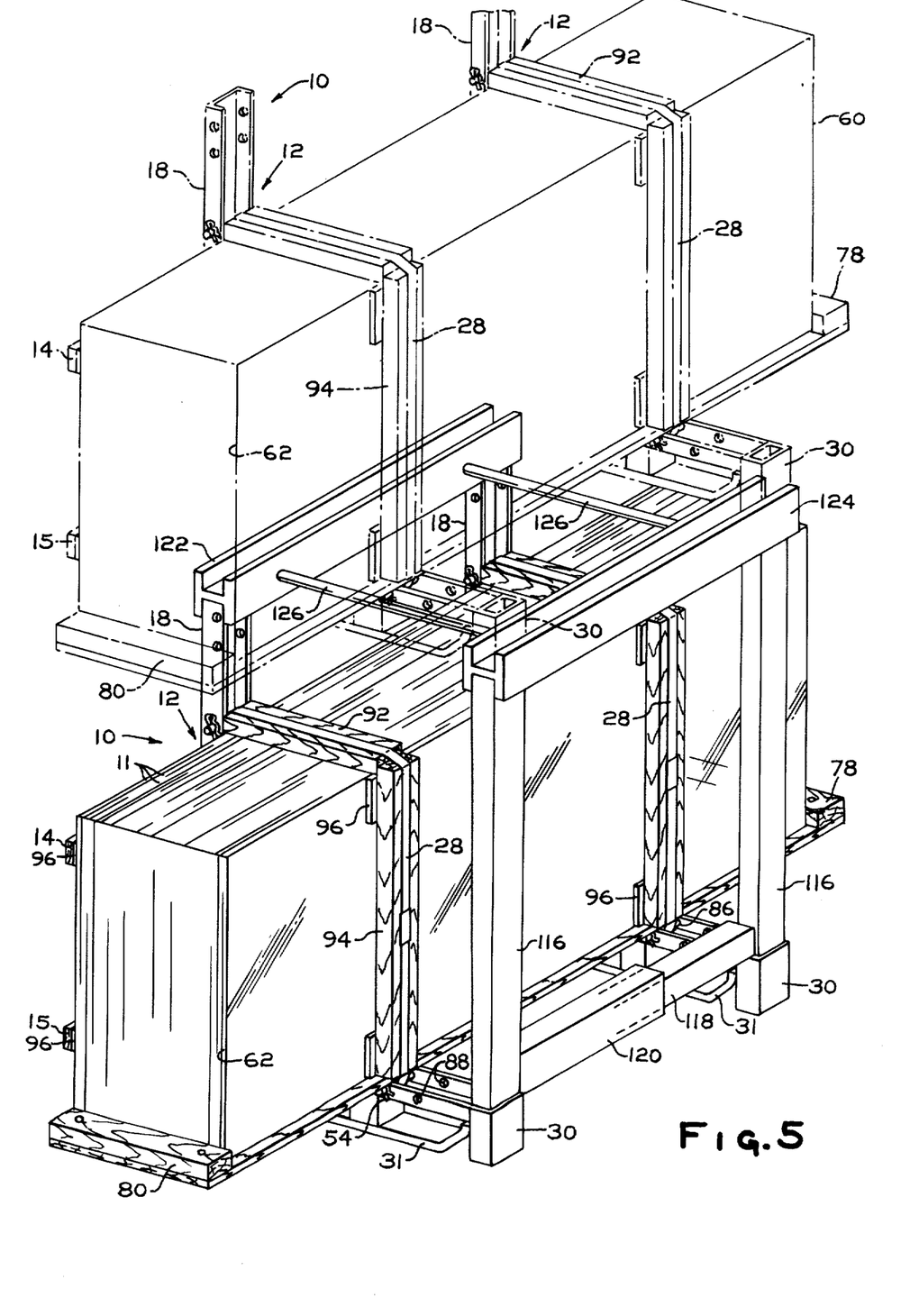
FIG. 5 is an isometric view of the rack of FIG. 4 provided with stacking facilities for stacking a loaded rack, shown in phantom lines, on top thereof.

Referring now to FIG. 5, the discussion will be directed to facilities which may be used for stacking loaded racks 10. As will be appreciated, the stacking facilities are merely illustrative of those that may be used and the invention is not limited thereto.

A pair of vertical structural members 116 have one end slideably mounted in the spacer member 30. The members 116 are interconnected by telescoping members 118 and 120, which engage the top end of members 30 to maintain the end of structural members 116 in position in the spacer member 30. Mounted on the top end of the vertical channel members 18 and the top end of the vertical structural members 116 as viewed in FIG. 5 is an I-shaped beam 122 and 124, respectively. The I-shaped beams 122 and 124 are interconnected by a pair of stringers 126 for simultaneously mounting the I-shaped beams 122 and 124 on the vertical members 18 and 116.

A second rack 10 loaded with glass sheets 11 (shown in phantom lines) has the end 20 of the vertical channel member 18 resting on the I-beam 122 and the spacer members 30 resting on the I-beam 124 as shown in FIG. 5.

Figure 6:
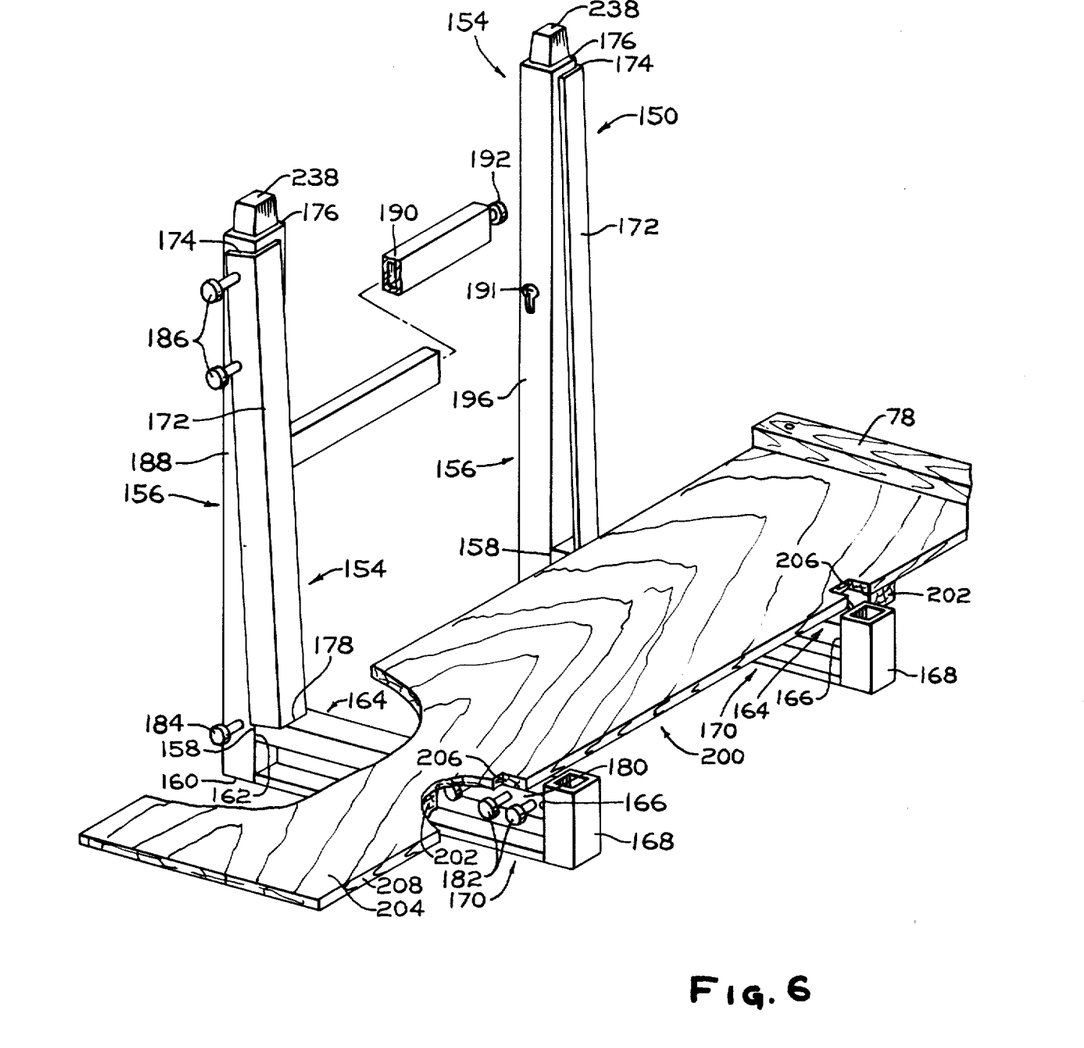
FIG. 6 is an isometric view of another embodiment of a collapsible rack constructed in accordance to the teachings of the invention and having portions removed for purposes of clarity.
Figures 7, 8:
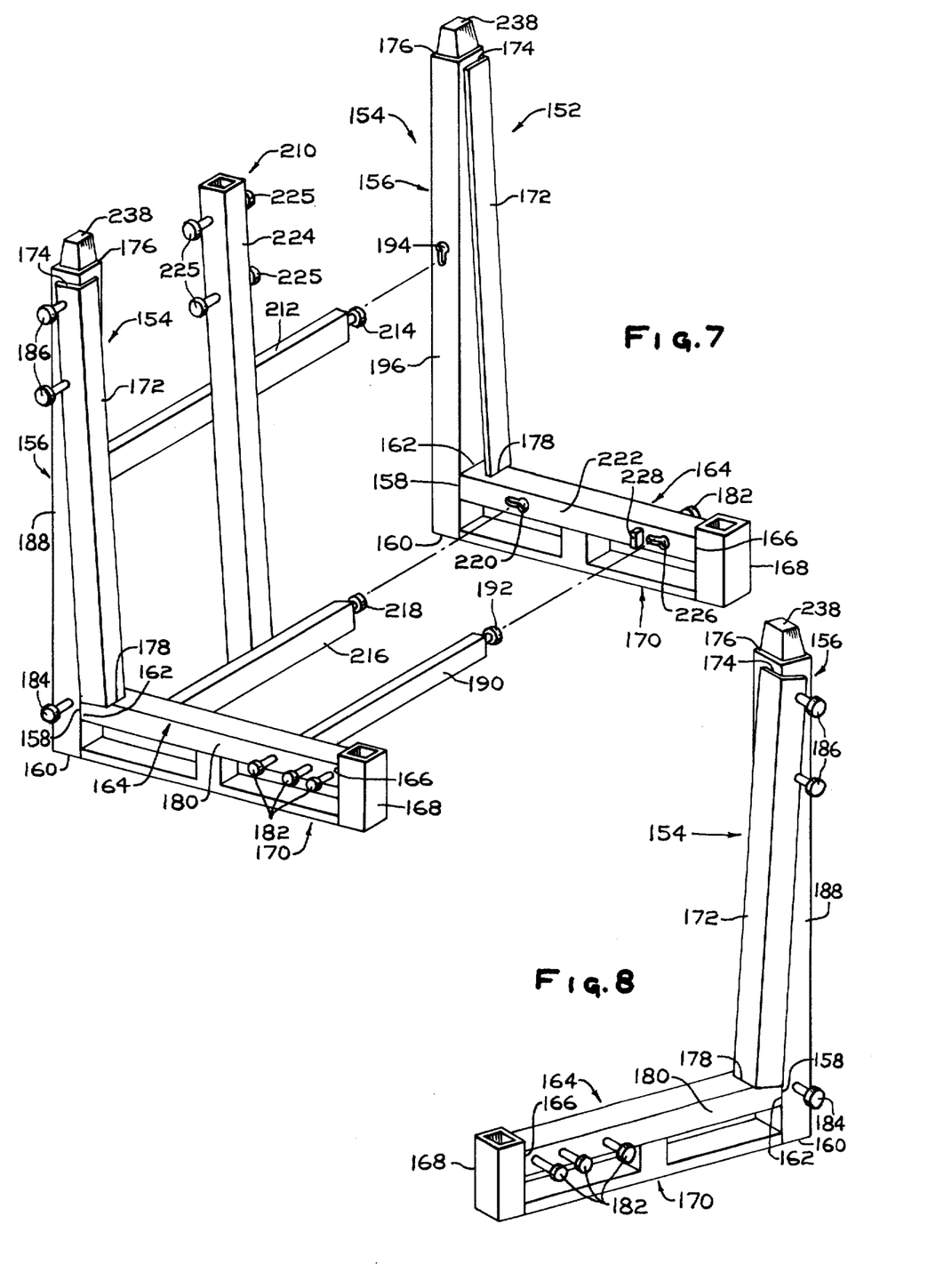
FIG. 7 is an isometric view of another embodiment of the collapsible rack shown in FIG. 6 having a center back support.
FIG. 8 is an isometric view of an L-shaped support constructed in accordance to the teachings of the invention and used with the collapsible racks of FIGS. 6 and 7.

Shown in FIGS. 6 and 7 are alternate embodiments of collapsible racks 150 and 152 constructed in accordance to the teachings of the invention. The racks 150 and 152 each have a pair of L-shaped members 154 (one shown in FIG. 8) held in spaced relation in a manner to be discussed below.

Referring to FIGS. 6, 7 and 8, the L-shaped member 154 includes a vertical arm 156 welded at 158, spaced from end 160 of the vertical member 156 to an end 162 of a horizontal arm 164. End 166 of the horizontal arm 164 is provided with a spacer member 168. Positioned between the spacer member 168 and the end 160 of the member 156 is a stabilizer bar 170 similar to the stabilizer bar 31 shown in FIGS. 1 and 2.

The arms 156 and 164 are preferably fabricated from hollow tubular steel sections; however, as can be appreciated the arms 156 and 164 may be made of any rigid material such as aluminum or fiberglass. Further the arms 156 and 164 may be made of solid sections. It is preferred to make the members of hollow tubular sections to minimize the cost of the rack and to reduce the weight of the rack.

An angle member 172 has end 174 welded adjacent to end 176 of the vertical arm 156 and the other end 178 welded to the horizontal arm 164 spaced from the vertical arm 156. The angle member (1) provides a tilted back for stacking stability; (2) provides structural strength for stability of the L-shaped supports 154 similar to the gusset plate 32 of the L-shaped supports 12 shown in FIG. 2 and (3) eliminates small swaying forces. The glass sheets 11 during shipment are subjected to transportation forces that tend to oscillate the glass sheets about the edge 64 (see FIG. 9). The angle member 172 tilted at about 3° to a line normal to the horizontal arm 164, eliminates small swaying forces.

Figure 9:
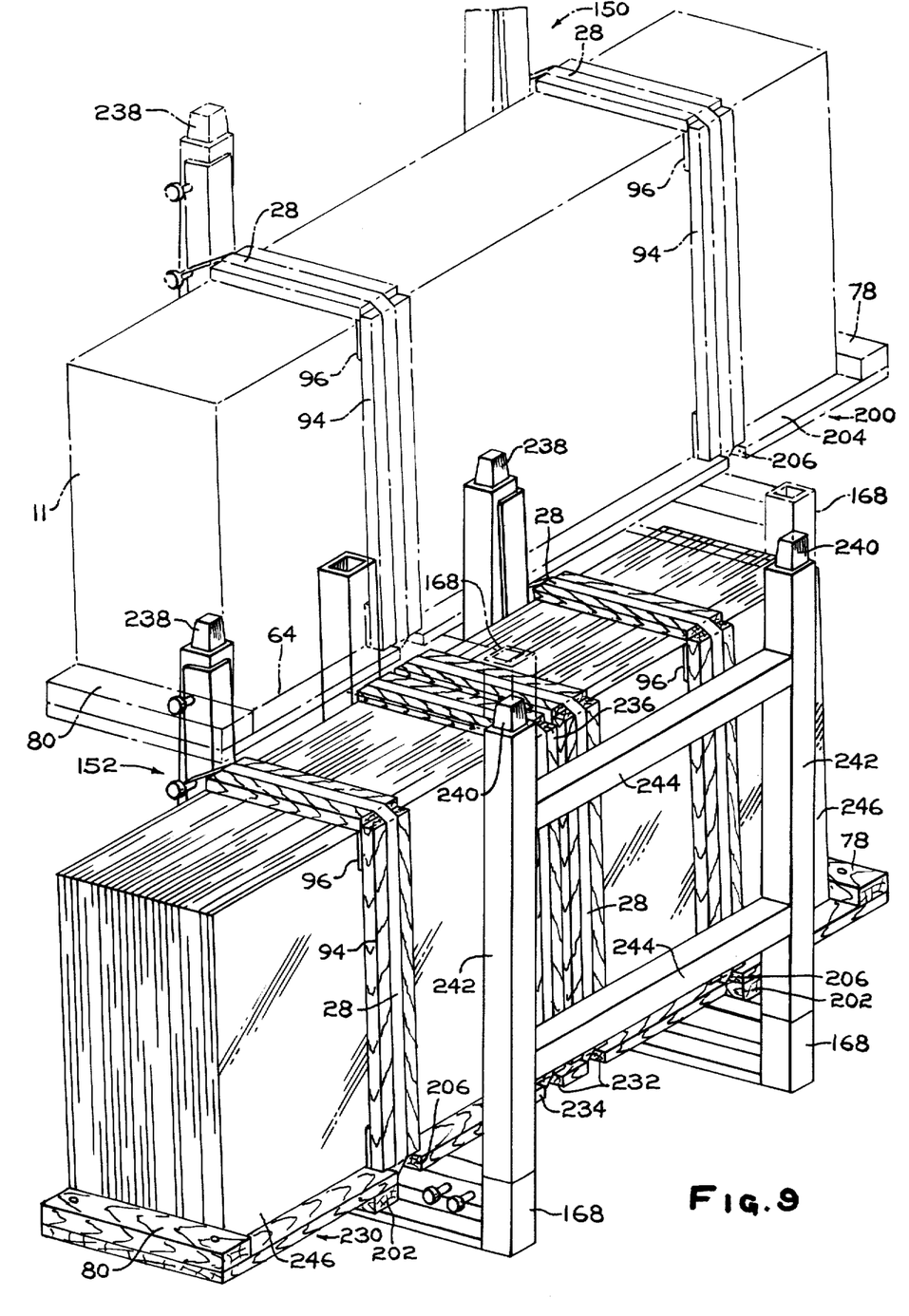
FIG. 9 is an isometric view having portions in phantom of the collapsible rack shown in FIGS. 6 and 7 loaded with glass sheets and provided with stacking facilities.

Mounted on side 180 of the horizontal arm 164 are a plurality of headed studs 182 spaced increasing distances from the end 166 of the arm 164. A headed stud 184 and headed studs 186 are mounted on side 188 adjacent end 160 and top end 176, respectively, of the vertical arm 156 as shown in FIG. 8. The studs 182, 184 and 186 are engaged by the banding 28 to utilize the glass sheets as shown in FIG. 9.

Referring specifically to FIG. 6, the L-shaped members 154 are maintained in spaced relation by a spacer bar 190. The ends of the spacer bar 190 are provided with headed studs 192 which are received in keyways 191 provided on side 196 of the vertical arm 156. The spacer bar 190 prevents longitudinal racking during loading and provides proper spacing for stacking a plurality of loaded racks in a manner to be discussed below.

A base 200 similar to the base 16 shown in FIG. 1, is supported on the horizontal members 164. The base 200 has a pair of spaced blocks 202 secured to the bottom surface of the base about the horizontal arms as shown in FIG. 6 to prevent longitudinal shifting of the glass pack during transit. The spacer block 202 also prevents movement of the horizontal arms toward and away from each other during loading. Mounted on upper surface 204 of the base 200 are the end restraints 78 (see also FIG. 9) to prevent longitudinal shifting of individual glass sheets during transit.

Although not limiting to the invention, but recommended to utilize one base for different load sizes, notches 206 are provided on side 208 of the base. The banding 28 passes through a notch, around one of the studs 182, around the stud 184 and around one of the studs 186 and about lash boards 94 (see FIG. 9). The ends of the banding are joined together in any conventional manner to urge the glass sheets together, against the vertical arm of the L-shaped members 156 and downward against the base 200.

The collapsible rack 150 shown in FIG. 6 is suitable for shipping single rows and/or tiers of glass sheets.

Referring now to FIG. 7, the discussion will be directed to the rack 152 which is preferred for shipping rows of glass (see FIG. 9). The L-shaped members 154 are held in spaced relation by an edge support 210 member having a Lorraine cross configuration as shown in FIG. 7. Upper horizontal cross member 212 has headed studs 214 which are inserted in the keyway 194 of the vertical arms and the lower horizontal cross member 216 has headed studs 218 inserted in keyway 220 provided on surface 222 of the horizontal arm 164. In this manner, vertical cross members 224 lie in the same plane as the angle irons 172 of the L-shaped members 154. Head studs 225 are mounted on opposed sides of the member 224 to receive the banding 28. The member 190 is preferably inserted in keyways 226 to horizontally support the edges of the glass rows. Although not limiting to the invention a stop member 228 is provided on the side 222 of the horizontal arm as shown in FIG. 7 to prevent rotation of the member 190 when the banding is applied.

Referring to FIG. 9, base 230 used with the rack 152 is similar to the base 200 and includes notches 232 in side 234 for receiving banding 28 about the end of the rows of glass as shown in FIG. 9.

Referring to FIG. 9, there is shown the rack 152 loaded with two rows of glass with the rows of glass separated by a wooden or cardboard divider 236.

The racks 154 and 152 may be stacked as shown in FIG. 9 by providing a male member 238 at the top of the vertical arm 156 and a male member 240 on each of a pair of standards 242. The standards 242 have the opposite end insertible in the spacer member 168 and are separated by bars 244. Loaded racks are stacked on top of each other by inserting the spacer blocks 168 of the top rack in the male members 240 of the standards ends 160 of the vertical arms 156 of the top rack in male member 138 of the bottom rack.

DETAILED DESCRIPTION OF THE INVENTION

Referring to FIG. 4, the collapsible rack 10 of the invention will be used to ship 105 glass sheets 11 having a length of 76 inches (1.93 meters) as measured between sides 60 and 62 and a width of 28 inches (0.7 meter) as measured between edges 64 and 66. The thickness of each glass sheet 11 is approximately 3/16 inch (0.48 centimeter).

With reference to FIG. 2, a first L-shaped support 12 is provided. The L-shaped support 12 includes a steel horizontal channel member 24 having an end 21 welded to a steel vertical channel member 18 at 19 spaced about 4⅜ inches (11 centimeters) from end 20 of the vertical channel member 18 to form the L-shaped support 12 having a guideway 26.

Welded to end 29 of the horizontal channel member 24 is a 6 inch (15.5 centimeters) long tubular spacer member 30 having a rectangular cross section of about 2 inches (5 centimeters) by 4 inches (10 centimeters) and a wall thickness of about ⅛ inch (0.3 centimeter). Mounted between and to the vertical channel member 18 adjacent end 20 and to spacer member 30 is a stabilizer bar 31 such as the type used in the art. The vertical member 18 has a length of about 55 inches (1.4 meters) and wall thickness of about 3/16 inch (0.48 centimeter). The horizontal channel member 24 has a length of about 27 inches (0.7 meter) and a wall thickness of about 3/16 inch (0.48 centimeter). The guideway 26 is about 1⅝ inches (4.1 centimeters) deep and 4 inches (10 centimeters) wide.

A pin 84 has its ends in walls 33 of the vertical channel member 18 adjacent end 21 of the horizontal channel member 24 and is captured therein by a pair of ¼ inch (0.6 centimeter) thick steel gusset plates 32. The gusset plates 32 are welded to outer opposed surfaces of the channel members 18 and 24 at the 19 to strengthen the L-shaped support.

A second L-shaped support similar to the first L-shaped support is provided.

Referring to FIG. 1, a steel banding 28, having a width of about ⅝ inch (1.6 centimeters) a thickness of 0.023 inches (0.06 centimeter) and a length of about 20 feet (6.1 meters) is positioned in the guideway 26 of each L-shaped support 12 under pin 84. Ends of the banding extending beyond ends of the L-shaped supports 12.

A base 16 made of 1⅛ inch (2.9 centimeters) thick pressed board having a width of about 2013/16 inches (0.5 meter) and a length of about 83 inches (2.1 meters) is provided on surface 76 with an end restraint 78 at one end. Opposed surface 72 of the base is provided with a pair of ribs 74 on a center-to-center spacing of about 38 inches (0.97 meter). The end restraint 78 and ribs 74 are made of wood and nailed to the surface 76 and 72, respectively, of the base 16. The end restraint 78 has a thickness of 1⅝ inches (4.1 centimeters); a width of about 3½ inches (8.9 centimeters); and a length of 2013/16 inches (0.5 meter). Each of the ribs 74 have a thickness of 1⅝ inches (4.3 centimeters); a width of about 2¾ inches (7 centimeters) and a length of 21⅝ inches (0.55 meter) so that one end of the ribs extends about 123/32 inches (4.5 centimeters) beyond the base 16.

The extending end of the ribs 74 is urged against the pins 84 of the L-shaped supports 12 and the ribs 74 are seated in the portion of the guideway 26 of the horizontal channel member 24 lying on the banding 28 in that portion of the guideway. In this manner, the L-shaped supports 12 are maintained in spaced relationship for subsequent loading. A headed steel pin 86, about ¾ inches (1.9 centimeters) in diameter and 51/16 inches (12.8 centimeters) in length, is inserted in hole 88 provided in opposed walls 90 of each of the horizontal support members 24 above the banding 28. The holes 88 are on a center-to-center spacing with the pin 84 mounted in the end 22 of the vertical channel member 18 about 22½ inches (0.6 meter). The pin is detachably secured in the holes 88 by a hitch pin 54 inserted in hole 128 at the end of the pin 86 as shown in FIG. 1.

A top cross support member 38 and a bottom cross support member 42 are detachably secured on each of the vertical channel members 18 of the L-shaped supports 12. Each of the cross support members are identical in construction and includes a channel member 48 having a wall thickness of about 3/16 inch (0.48 centimeter), a length of about 49/16 inches (11.5 centimeters), a spacing between walls of about 3⅝ inches (9.2 centimeters) and a wall depth of 17/16 inches (3.7 centimeters). Welded on the back wall 46 of the channel member 48 are a pair of plates 44, about ¼ inch (0.6 centimeter) thickness and extending about 1⅝ inches (4.1 centimeters) from the back wall 46 of the channel member 48. A hole 52 is provided in each of the plates to mount the cross members to respective holes 34 and 36 provided on the vertical channel members with steel headed pins 50. The pins 50 are 5½ inches (14 centimeters) in length and have a diameter of ¾ inch (1.9 centimeters). A hole 52 is provided at the end of the pin to receive hitch pin 54 to detachably secure the cross support members to the vertical channel members 18 (see FIG. 3).

The top cross support member 38 is detachably secured to a pair of top holes 34 spaced about 23 13/16 inches (0.6 meter) from top end of the vertical cross member as viewed in FIG. 1. The bottom cross support member 42 is detachably secured to the bottom holes 36 spaced about 39 inches (0.99 meters) from the top end of the vertical channel member 18 as viewed in FIG. 1.

A steel headed pin 40 similar to pin 86 is mounted in a pair of opposed top holes 34 spaced about 3 inches (7.6 centimeters) above the center line of top cross member 42 and detachably secured in place by a hitch pin 54 passing through hole 128 at the end of the pin 40.

In each instance, the pins 50 and 40 capture the banding 28 in the portion of the guideway 26 of the vertical support member 18. In this manner when the banding is secured about the glass sheets, the L-shaped supports and glass sheets are unitized.

A wooden strut 14 is seated in the channel member 48 of each of the top cross support members 38. Similarly a wooden strut 15 is seated in the channel member 48 of the bottom cross support members 42. The struts 14 and 15 are about 76 inches (1.9 meters) long; 2¾ inches (6.99 centimeters) wide and 1⅝ inches (4.1 centimeters) thick and are secured in their respective channel members 48 by double headed nails 130 passing through holes 132 provided on each cross support member 38 and 42 (shown in FIG. 2).

A piece of corrugated fiberboard 96 is attached to outer surface of each of the struts to prevent marring of the surface of the innermost glass sheet in contact therewith.

The assembled rack is tilted at about a 5° angle in any conventional manner for loading. The bottom edge 64 of glass sheets 11 rest on the base 16, nested with end restraint 78 and supported in the vertical position by the struts 14 and 15. Interleaver material, e.g., wood flour or paper is provided between the glass sheets to prevent marring of adjacent surfaces. A first pair of lash boards 94 having length of about 28½ inches (0.7 meter); a width of about 3⅝ inches (9.2 centimeters) and a thickness of about 1⅝ inches (4.1 centimeters) are provided with a pair of corrugated fiberboard pads 96 to prevent marring of the surface of the outermost glass sheet. An end of the lash board 94 rests on the base 16 extending beyond the base 16 with the opposite end about ½ inch (1.27 centimeters) above the glass edge 66. A second pair of wooden lash boards 92, each having a thickness of about 1⅝ inches (4.1 centimeters); a width of about 3⅝ inches (9.2 centimeters) and a length of about 20 inches (0.5 meter) has one end contacting the front lash board 94 and extends back toward the vertical channel member 18.

The ends of the banding are joined about the lash boards 92 and 94 in any conventional manner to urge the glass sheets together against the struts 14 and 15 and downward against the base 16. An end restraint 80 is provided adjacent side 62 of the glass sheets. The rack is now loaded and ready for shipment.

With reference to FIG. 5, the racks may be stored one on top of another by providing a pair of vertical structural members 116, each about 55 inches (1.4 meters) in length and having a slideable fit-in spacer member 30. The structural members are joined by telescoping members 118 and 120 spaced about 6 inches (15.2 centimeters) from an end. The ends of the structural members 116 are positioned in spacer members 30. A pair of aluminum I-beams 122 and 124, joined by stringers 126, are mounted on top each end of the vertical tube member 116 and vertical channel members 18, as viewed in FIG. 5. A second rack is stacked by on the I-beams as shown in FIG. 5.

For unloading, the loading rack 10 is tilted at about a 5° angle in any conventional manner and unloaded in the reverse order of loading. The rack 10 is disassembled by removing nails 130 from the U-shaped channel member 48 of the cross supports 38 and 40 to free the struts 14 and 15. The base is lifted away from the horizontal members 24, and thereafter, the banding 28 is removed and discarded. The rack is now disassembled, and the L-shaped supports, struts and base can be stored for return shipment.

The discussion will now be directed to loading the racks 150 and 152 of FIGS. 6 and 7, respectively. In the following discussion, all tubular steel members have a cross-section of about 2½ by 2½ inches (6.4 centimeters by 6.4 centimeters) and a wall thickness of about 1/8 inch (0.32 centimeter) unless indicated otherwise.

Referring to FIG. 8, a pair of L-shaped supports 154 are provided. Each of the L-shaped supports include a vertical arm 156 and a horizontal arm 164 each made of hollow tubular steel. The horizontal arm 164 having length of about 25 inches (0.6 meter) has end 162 welded to the vertical arm 156 at 158 spaced from the end 160 of the horizontal arm 164. A spacer member 168 made of hollow tubular steel is secured to end 166 of the horizontal arm 164 to maintain the horizontal arm about 4 inches (10 centimeters) above the floor. Stabilizing bar 170 is provided below the horizontal arm between spacer block and vertical arm.

Surface 180 of the horizontal arm 164 is provided with 3 headed studs 182 spaced about 1¾ inches (4.4 centimeters), 3¼ inches (8.3 centimeters) and 4¾ inches (12 centimeters) from the end 166 of the horizontal member 164. Opposed surface 222 of the horizontal arm 164 is provided with a first keyway 220 spaced about 21¾ inches (0.55 meter) and a second keyway 226 spaced about 5¾ inches (14.6 centimeters) from the end 166 of the horizontal arm 164 as shown in FIG. 7. A stop member 228 is mounted adjacent the keyway 226 as shown in FIG. 7.

The vertical arm 156 having a length of about 42¼ inches (1.1 meters) is provided at its top end 176 with a truncated pyramid member 238. Side 188 of the vertical arm 156 is provided with headed studs 186 spaced about 2 inches (5 centimeters) and 6 inches (15.2 centimeters) and headed stud 184 spaced 37 inches (0.9 meter) from the end 176 of the vertical arm 156. Opposed surface 196 is provided with a keyway 194 spaced about 17 inches (43 centimeters) from the end 176 of the vertical arm 156 as shown in FIGS. 6 and 7.

An angle member 172, about 35¾ inches (0.91 meter) in length and a thickness of about ¼ inch (0.62 centimeter) has one leg about 2½ inches (6.4 centimeters) in width and the other leg about 1½ inches (3.8 centimeters). One end of the member 172 is welded adjacent to top end 176 of the vertical arm 156 and the other end welded to the horizontal member spaced about 6 inches (13 centimeters) from the vertical arm to provide a 3° slope. Preferably the sides of the two legs of the angle member 172 supports the glass sheets to be loaded.

The L-shaped supports 154 are employed to provide the rack 150 of FIG. 6 to stack a single row of glass sheets 11 in the following manner.

A cross bar 190 made of hollow tubular steel about 32 inches (0.8 meter) in length having a cross-section of about 2 inches (5 centimeters) by 1 inch (2.54 centimeters) and a wall thickness of about ⅛ inch (0.32 centimeter) is provided with headed studs 192 at its ends. The headed studs are inserted in keyways 194.

A base 200 made of 1⅛ inch (2.9 centimeters) thick pressed board having a width of about 22¾ inches (0.6 meter) and a length of about 83 inches (2.1 meters) is provided on surface 204 with the wooden end restraint 78 at one end. Opposed surface of the base 200 is provided with blocks 202 spaced about 39½ inches (1 meter) apart. A pair of notches 206 about 3 inches (7.5 centimeters) deep and about 1 inch (2.54 centimeters) wide are provided on side 208 of the base on a center-to-center spacing of about 38 inches (0.97 meter) spaced 32 inches (0.8 meter) and 16 inches (0.4 meter) from the end restraint. The base is supported on the horizontal arm with the spaced blocks 202 adjacent the headed studs 182 as shown in FIG. 6.

A corrugated cardboard sheet (not shown) is positioned against the angle members 172 and the glass sheets are stacked as previously discussed. The lash boards 94 and banding 28 are provided about the glass sheets to urge the sheets toward the angle member and downward toward the base 200. Referring to FIG. 9, the banding has its course around the lash boards through the notch and around the studs. An end restraint 80 is thereafter secured to the base against the edges of the glass sheets to prevent longitudinal motion of the individual glass sheets during shipment.

With reference to FIG. 7, the collapsible rack 154 of the invention will be used to ship two rows of glass sheets. The glass sheets have a length of about 38 inches (0.97 meter), a width of about 28 inches (0.7 meter) and a thickness of about 3/16 inch (0.48 centimeter).

A pair of L-shaped members 154 have their horizontal arms separated by the spacer bar 190 inserted in keyways 206 and urged against stop member 228. An edge support 210 includes an upper horizontal member 212 and a lower horizontal member 214 secured to a vertical cross member 214 to provide a Lorraine cross configuration. The members 212 and 214 are each about 36 inches (0.9 meter) in length and have headed studs 214 and 218 at their ends. The vertical cross member is about 37¾ inches (0.96 meter) in length and has studs 225 spaced 2 inches (5.08 centimeters) and 6 inches (15.2 centimeters) from the top end as viewed in FIG. 7. The studs 214 and 218 of the members 212 and 216 are inserted in the keyways 194 and 220 of the vertical arm 156 and horizontal arm 164, respectively.

Referring to FIG. 9, a base 230 similar to the base 200 is provided on the horizontal arm 164 in center on a center-to-center spacing of 3½ inches. The base includes the notches 206 and notches 232. The notches 232 are in a center-to-center spacing of about 3½ inches (8.9 centimeters) about the center of the base 230.

A corrugated fiberboard (not shown) is positioned on the angle members and vertical cross members 224. A row of glass sheets are mounted on the base supported by the angle member and the vertical cross member in a vertical position with the glass edges in contact with the end restraint 78. A wooden divider 236 is positioned against opposite edges of the stacked glass sheets and a second row is stacked on the rack. Banding and lash boards are used as shown in FIG. 9 and as previously discussed to urge the row of glass sheets against the back support and the base.

The loaded racks may be stacked as shown in FIG. 9 by providing a pair of standards 242 separated by bars 224. The standards have a truncated pyramid member 240 at their top end for receiving the spacer block 168 of the top rack 150. The vertical arms of the rack 150 are supported on the vertical arms of the lower rack 152 as shown in FIG. 9.

In general, the space occupied by 12 collapsed racks constructed in accordance to the teachings of the invention is equivalent to the space occupied by one assembled and loaded rack.

What is claimed is:

1. A collapsible rack for shipping and storing a plurality of flat sheets comprising:
   at least two L-shaped supports made of a rigid material, each of said L-shaped supports comprising a vertical arm and a horizontal arm;
   means for supporting said horizontal arm in spaced relation to a supporting surface; and
   means detachably secured to said at least two L-shaped supports for maintaining at least two L-shaped supports in spaced relation, said maintaining means including a base having means on the underside engaging said horizontal arms for limiting movement of said horizontal arms.

2. The collapsible rack as set forth in claim 1 wherein said maintaining means further includes at least one strut detachably secured to said vertical arm of each of said at least two L-shaped supports.

3. The rack as set forth in claim 1 wherein said supporting means includes lift stabilizing means.

4. The rack as set forth in claim 1 wherein each said at least two L-shaped supports comprises:
   a first U-shaped channel member having an end;
   a second U-shaped channel member having a first end and a second end;
   means for securing the first end of said second U-shaped channel member to said first U-shaped channel member in spaced relation to the end of said first U-shaped channel member; and
   said supporting means comprises:
   spacer block secured to the second end of said second U-shaped channel member; and
   a stabilizer bar mounted between said spacer block and said first U-shaped channel member.

5. The rack as set forth in claim 4 wherein said first and second U-shaped channel members form a guideway and further including:
   flexible banding material in the guideway; and
   means for detachably securing the banding in the guideway.

6. The rack as set forth in claim 1 wherein each of said at least two L-shaped supports comprises:
   a first tubular member having an end;
   a second tubular member having a first end and a second end;
   means for securing the first end of said second tubular member to said first tubular member in spaced relation to the end of said first tubular member; and
   said supporting means comprises:

spacer block secured to the second end of said second tubular member.

7. The rack as set forth in claim 6 wherein said mounting means further includes:
at least one strut detachably secured to and between each of the vertical members of said L-shaped supports.

8. The rack as set forth in claim 6 further including:
a rigid back support mounting the vertical arm of each of said L-shaped supports wherein a line normal to the horizontal arm of the L-shaped support and the surface of said back support subtend an angle greater than zero degrees.

9. The rack as set forth in claim 6 further including:
a plurality of headed studs mounted on a side of each of said L-shaped supports to define a course for flexible banding.

10. A collapsible rack for shipping and storing a plurality of flat glass sheets comprising:
a pair of L-shaped supports each comprising:
a first U-shaped channel having an end;
a second U-shaped channel member having a first end and a second end;
means for securing the first end of said second channel member to said first channel member in spaced relation to the end of said first channel member to provide a guideway in the L-shaped support;
a spacer block secured to the second end of said second channel; and
a stabilizer bar mounted between said spacer block and the end of said first channel member;
a base;
a pair of spaced ribs mounted on the underside of said base and received in the guideway of said second channel member to maintain said pair of L-shaped members in spaced relation;
at least one strut;
means for detachably securing said at least one strut to the vertical member of each of said L-shaped supports;
flexible banding material in the guideway of each of said L-shaped supports; and
means for detachably securing said banding in the guideway of each of said L-shaped supports.

11. The collapsible rack as set forth in claim 10 further comprising:
stacking means, comprising;
a vertical structural member slidably mounted in said spacer block;
a first I-beam member mounted on top of said vertical channel members; and
a second I-beam member mounted on top of said U-shaped channel members.

12. The collapsible rack as set forth in claim 10 wherein the topside of said base has at least one end restraint.

13. A collapsible rack for shipping and storing a plurality of flat glass sheets, comprising:
a pair of L-shaped supports each comprising:
a first tubular member having an end;
a second tubular member having a first end and a second end;
means for securing the first end of said second tubular member to said first tubular member in spaced relation to the end of said first tubular member;
a spacer block secured to the second end of said tubular member;
a stabilizer bar mounted between said spacer block and said first tubular member;
a back support mounting the first and second tubular member; and
a plurality of headed studs mounting a side portion of said first and second tubular member;
a base supported on said second tubular member;
a pair of spaced ribs mounted on the underside of said base for preventing movement of said second tubular member of each of said L-shaped supports from moving away from each other;
a strut; and
means for detachably secured said strut to and between said first tubular member of said L-shaped supports.

14. The rack as set forth in claim 13 wherein said base is provided with a notch wherein the notch is in alignment with the headed studs on said second tubular member to define the course of banding.

15. The collapsible rack as set forth in claim 13 wherein the topside of said base has at least one end restraint.

16. The rack as set forth in claim 13 further comprising:
stacking means, comprising:
a vertical structural member slideably mounted in said spacer block;
a protrusion mounted on top end of each of said vertical structural members and insertible in spacer block; and
a protrusion mounted on top of each of said first tubular members and insertible in the end of said first tubular member of the rack to be stacked.

17. The rack as set forth in claim 13 wherein said strut is a horizontal cross member of a back support further includes:
a vertical strut;
a first horizontal cross member secured to said vertical strut;
a second horizontal cross member secured to said vertical strut in spaced relation to said first horizontal cross member; and
means for detachably securing said first cross member to and between said first tubular member and said second cross member to and between said second tubular members such that said vertical strut and said back support lie in an imaginary plane.

18. The rack as set forth in claim 17 wherein a line normal to the base and the imaginary plane subtend an angle greater than zero degrees.

19. The rack as set forth in claim 18 wherein the angle is about 3° to 5°.

20. The rack as set forth in claim 19 further including:
a cross support detachably secured to and between said second tubular member in spaced relation to said second horizontal cross member of said back support.

* * * * *